(12) United States Patent
Shima et al.

(10) Patent No.: US 8,873,803 B2
(45) Date of Patent: Oct. 28, 2014

(54) ROAD-SHOULDER DETECTING DEVICE AND VEHICLE USING ROAD-SHOULDER DETECTING DEVICE

(75) Inventors: Takeshi Shima, Mito (JP); Mirai Higuchi, Mito (JP); Shoji Muramatsu, Hitachinaka (JP); Tatsuhiko Monji, Hitachinaka (JP); Takuya Naka, Yachiyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 103 days.

(21) Appl. No.: 13/519,347

(22) PCT Filed: Aug. 9, 2010

(86) PCT No.: PCT/JP2010/063483
§ 371 (c)(1),
(2), (4) Date: Jun. 27, 2012

(87) PCT Pub. No.: WO2011/080943
PCT Pub. Date: Jul. 7, 2011

(65) Prior Publication Data
US 2012/0288154 A1    Nov. 15, 2012

(30) Foreign Application Priority Data

Dec. 28, 2009   (JP) ................................. 2009-296670

(51) Int. Cl.
*G06K 9/00*  (2006.01)
*G06T 7/00*  (2006.01)
*B60W 30/12* (2006.01)
*G08G 1/16*  (2006.01)

(52) U.S. Cl.
CPC ..... *G06T 7/0081* (2013.01); *G06T 2207/10021* (2013.01); *B60W 30/12* (2013.01); *G06K 9/00798* (2013.01); *G08G 1/166* (2013.01); *G06T 2207/30256* (2013.01); *G08G 1/165* (2013.01); *G06T 2207/20148* (2013.01); *G06T 7/0097* (2013.01); *G08G 1/167* (2013.01)
USPC ............ 382/103; 382/104; 382/106; 382/108

(58) Field of Classification Search
USPC ................. 382/103, 104, 106, 107, 108, 278; 340/907, 933
See application file for complete search history.

(56) References Cited

U.S. PATENT DOCUMENTS 6,370,261 B1    4/2002 Hanawa
6,625,300 B1 *  9/2003 Kyo .............................. 382/104

(Continued)

FOREIGN PATENT DOCUMENTS

JP          8-16998 A      1/1996
JP         11-213138 A     8/1999

(Continued)

OTHER PUBLICATIONS

International Search Report with English translation dated Nov. 2, 2010 (seven (7) pages).

(Continued)

*Primary Examiner* — Yosef Kassa
(74) *Attorney, Agent, or Firm* — Crowell & Moring LLP (57) ABSTRACT

Disclosed is a road-shoulder detecting device including a distance-information calculating portion for calculating the presence of a physical object and the distance from the subject vehicle to the object from input three-dimensional image information relating to an environment around the vehicle, a vehicular road surface detecting portion for detecting a vehicular road surface with the subject vehicle from a distance image, a height difference calculating portion for measuring height difference between the detected vehicular road and an off-road region, and a road shoulder decision portion for deciding height difference as to whether the road shoulder is boundary between the surface and the region in a case where there is an off-road region lower than the vehicular road surface.

12 Claims, 9 Drawing Sheets

(56) References Cited

U.S. PATENT DOCUMENTS

| | | | |
|---|---|---|---|
| 7,038,577 B2 * | 5/2006 | Pawlicki et al. | 340/435 |
| 7,046,822 B1 | 5/2006 | Knoeppel et al. | |
| 8,224,564 B2 * | 7/2012 | Ogasawara et al. | 701/301 |
| 8,269,652 B2 * | 9/2012 | Seder et al. | 340/903 |
| 8,384,532 B2 * | 2/2013 | Szczerba et al. | 340/435 |
| 8,395,529 B2 * | 3/2013 | Seder et al. | 340/905 |
| 8,436,902 B2 * | 5/2013 | Kuehnle | 348/148 |
| 8,509,523 B2 * | 8/2013 | Schamp | 382/156 |
| 8,594,370 B2 * | 11/2013 | Schamp et al. | 382/103 |
| 8,599,257 B2 * | 12/2013 | Takahashi | 348/148 |
| 8,611,692 B2 * | 12/2013 | Nimnual et al. | 382/276 |
| 2003/0099377 A1 | 5/2003 | Hanawa | |
| 2005/0107931 A1 | 5/2005 | Shimakage et al. | |
| 2006/0132295 A1 | 6/2006 | Gern et al. | |
| 2009/0052742 A1 | 2/2009 | Okamoto | |

FOREIGN PATENT DOCUMENTS

| | | |
|---|---|---|
| JP | 2003-233899 A | 8/2003 |
| JP | 2005-145198 A | 6/2005 |
| JP | 2007-232389 A | 9/2007 |
| JP | 2007-331652 A | 12/2007 |
| JP | 2008-5932 A | 1/2008 |
| JP | 2009-53818 A | 3/2009 |
| JP | 2009-139323 A | 6/2009 |
| JP | 2010-55340 A | 3/2010 |

OTHER PUBLICATIONS

European Search Report dated Jan. 7, 2014 (Eleven (11) pages).

Hoff, et al., "Surfaces from Stereo: Integrating Feature Matching, Disparity Estimation, and Contour Detection", Transactions on Pattern Analysis and Machine Intelligence, IEEE, Piscataway, USA, vol. 11, No. 2, Feb. 1, 1989, pp. 121-136, (Sixteen (16) pages).

Wedel, et al., "B-Spline Modeling of Road Surfaces for Freespace Estimation", Intelligence Vehicles Symposium, 2008, IEEE, Piscataway, NJ, USA, Jun. 4, 2008, pp. 828-833, (Six (6) pages).

* cited by examiner

ROAD-SHOULDER DETECTING DEVICE AND VEHICLE USING ROAD-SHOULDER DETECTING DEVICE

TECHNICAL FIELD

The present invention relates to a road-shoulder detecting device for detecting road shoulders from off-vehicle image information and to a vehicle using the same.

BACKGROUND ART

In order to realize safe vehicle motion, apparatus for automatically controlling steering of a vehicle, accelerator, and brakes have been researched and developed by detecting dangerous events around the vehicle so as to avoid the detected dangerous events. Some vehicles are already equipped with such apparatus. Among them, a system which detects white lines and road shoulders by sensors installed in the vehicle and which, when there is a danger that the vehicle will run off the lane or road, alerts the driver and a system that controls the vehicle speed or direction of motion by automatic brake control or by automatic steering control are effective in preventing road departure accidents.

In preventing the vehicle from running off the lane, a system is put into practical use which detects a white line using an in-vehicle monocular camera or stereo camera and which alerts the driver when the vehicle runs off the lane from the positional relationship between the detected white line and the vehicle. Furthermore, regarding a system which detects a white line by an in-vehicle camera and which controls the steering of the vehicle in a case where the vehicle is about to run off the lane from the positional relationship between the detected white line and the vehicle, there is much patent literature.

Furthermore, an apparatus for detecting a three-dimensional object on a road shoulder such as a guardrail by means of a stereo camera is shown in patent literature 1. Use of this system makes it possible to alert the driver or control the steering in a case where the vehicle is likely to collide with the three-dimensional object on the road shoulder, even if there is no white line.

Further, patent literature 2 sets forth an apparatus that detects a gutter in a road shoulder using an in-vehicle monocular camera. Here, the gutter is detected by making use of the fact that motion on a road surface is different from portions located at positions lower than the road surface using brightness information of an image from the monocular camera.

CITATION LIST

Patent Literature

Patent Literature 1: JP-A-2008-5932
Patent Literature 2: JP-A-2009-53818

SUMMARY OF INVENTION

Technical Problem

Where a road shoulder of a vehicular road ahead of a vehicle is detected by an in-vehicle sensor and a warning of deviation from the lane is issued or control is provided to prevent the vehicle from running off the lane, in a case where a white line is detected, it is impossible for the case of a system detecting a white line to prevent such an accident that the vehicle runs off the road in a case where there is no white line on the road.

Furthermore, in the case of the system of patent literature 1, even where there is no white line, if there is a three-dimensional object such as a guardrail on a road shoulder, it is possible to cope with road departure accidents. However, where there is neither white line nor three-dimensional object on road shoulders, it is impossible to cope with such accidents.

Additionally, in the case of patent literature 2, it is possible to cope with the case where there is neither white line nor three-dimensional object on a road shoulder that is formed by portions lower than the road surface. However, it is difficult to apply this technique to practical environments where the illumination varies because brightness information from a monocular camera is utilized.

It is an object of the present invention to provide a road-shoulder detecting device that detects road shoulders from image information if there is neither a white line nor a three-dimensional object such as guardrails on the road shoulders that are the boundaries between a vehicular road surface and off-road regions.

Solution to Problem

In order to achieve the above-described object, the present invention is configured including a distance information calculating portion for calculating presence or absence of a physical object and the distance from a subject vehicle to the object from input three-dimensional image information about an environment outside of the vehicle, a vehicular road surface detecting portion for detecting a vehicular road surface traveled by the subject vehicle from a distance image based on the calculated distance, a height difference calculating portion for measuring a height difference between the detected vehicular road surface and an off-road region, and a road shoulder decision portion for making a decision based on the measured height difference as to whether a road shoulder being a boundary between the vehicular road surface and the off-road region is a road shoulder occurring in a case where there is an off-road region lower than the vehicular road surface.

Furthermore, the invention may be so configured as to have a distance information calculating portion for calculating the presence or absence of a physical object and the distance from a subject vehicle to the object from input three-dimensional image information about an environment outside of the vehicle, a discontinuity calculating portion for separating a distance image based on the calculated distance into a plurality of image regions, calculating whether the distance between any two of the image regions is equal to or greater than a predetermined threshold value, taking a case in which the predetermined threshold value is reached or exceeded as discontinuous, and determining this case as a road shoulder, and a road shoulder decision portion for making a decision based on the calculated road shoulder as to whether a road shoulder being a boundary between a vehicular road surface and an off-road region is a road shoulder occurring in a case where there is an off-road region lower than the vehicular road surface.

Advantageous Effects of Invention

A road-shoulder detecting device can be offered which detects a road shoulder from image information about the outside of the vehicle even if a white line or a three-dimensional object such as a guardrail does not exist on a road shoulder that is the boundary between the vehicular road surface and an off-road region.

DESCRIPTION OF EMBODIMENTS

Embodiments are hereinafter described with reference to drawings.

The above description has been made in relation to the embodiments. The present invention is not restricted thereto. It is obvious to those skilled in the art that various changes and modifications can be made within the scope of the spirit of the present invention and the appended claims.

Embodiment 1

Here, a description is presented of an embodiment in a case where the present invention is applied to a system that provides control to alert the driver or to prevent the vehicle from running off the road in a case in which road shoulders of a vehicular road in front of a vehicle (hereinafter, the boundary between a portion through which an automobile can travel and a portion through which the automobile cannot travel is referred to as a road shoulder) are detected using an image from an in-vehicle stereo camera and there is the possibility that the vehicle will run off the road (hereinafter, a region on which the automobile cannot go is referred to as an "off-road" region), In the present invention, a stereo camera is used as a means for obtaining information about an environment outside the vehicle. Any means can be used as long as it can measure three-dimensional information. For instance, the invention can be applied in a case where a plurality of monocular cameras (imaging devices) are used.

Figure 1:
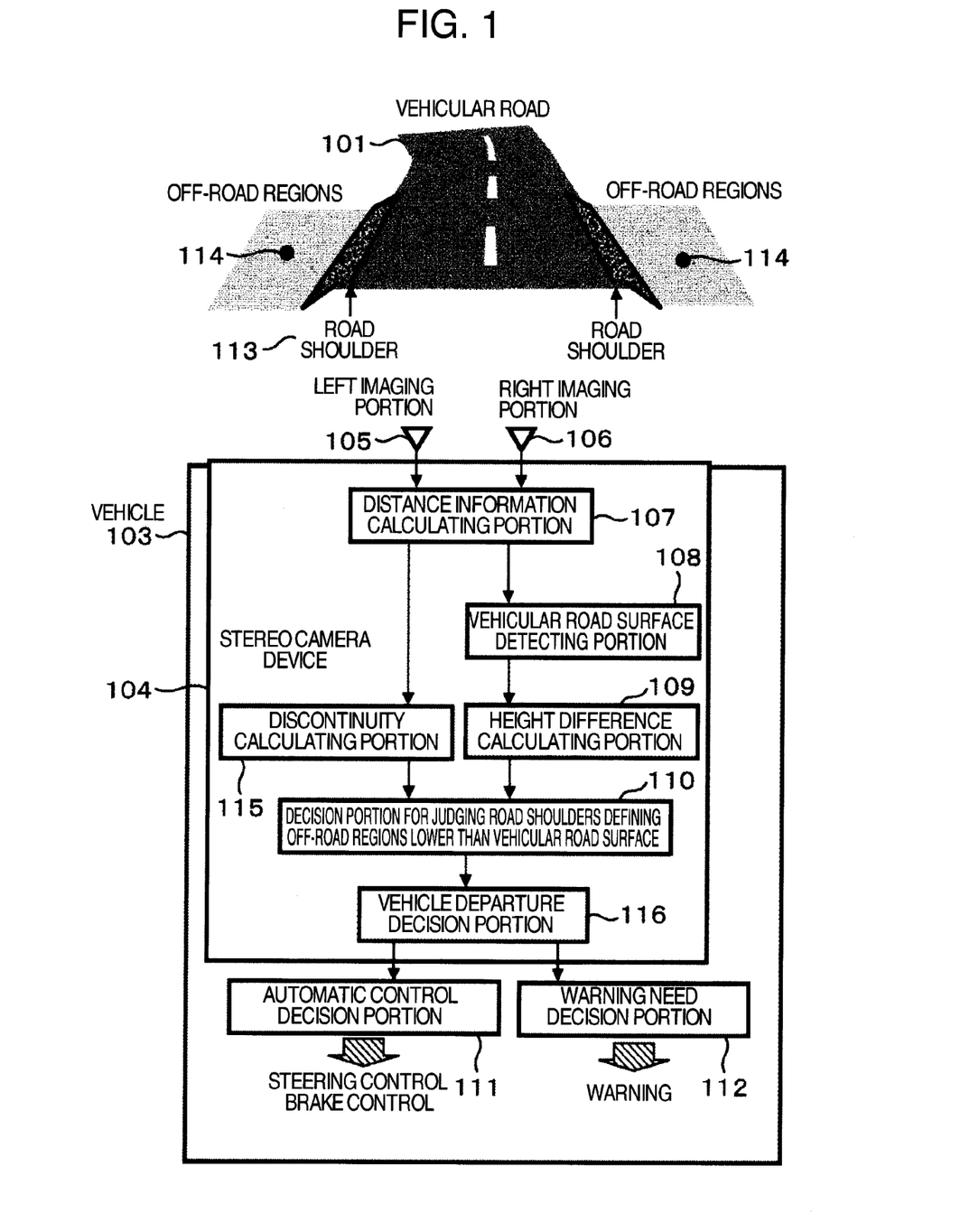
FIG. 1 is a view illustrating an outline of a road-shoulder detecting device associated with the present invention.

A summary of the road-shoulder detecting device of the present invention is first described by referring to FIG. 1.

In FIG. 1, a stereo camera device 104 is mounted in a vehicle 103. A range covered by the camera device is set in front of the vehicle 103. Three-dimensional information about a three-dimensional object ahead of the vehicle 103 can be measured. Details of the stereo camera device 104 will be described later.

When the vehicle 103 is going on a vehicular road 101, the stereo camera device 104 measures the positional relation between a road shoulder 113 of a road ahead of the vehicle and the vehicle, the height difference between the vehicular road surface capable of being traveled by an automobile (hereinafter referred to as the vehicular road surface traveled) and off-road regions 114, and the discontinuity with the surface along which the subject vehicle is traveling, and makes a decision as to whether there is a danger that the vehicle will run off the road and a decision as to whether the off-road regions are lower than the road surface traveled. Road shoulders occurring in a case where the off-road regions are lower than the road surface traveled or where the road surface has discontinuity are hereinafter referred to as "road shoulders delineated by off-road regions lower than a road surface traveled".

Then, the camera device issues to the driver a warning of the danger that the vehicle will run off the road and transmits decision information as to automated braking control and as to whether automated steering control is needed and the positional relationship between each road shoulder and the vehicle to an HMI (human machine interface) or vehicle controller mounted in the vehicle 103.

The HMI has a screen, a speaker, a vibrator, or the like capable of transmitting a dangerous event to the driver. Where it is necessary to alert the driver of the danger that the vehicle will run off the road, the HMI issues a warning to the driver using a means such as a screen, speech, or vibration of the steering wheel or seat.

The vehicle controller performs automatic brake control or automatic steering control, based on decision information as to whether automatic brake control or automatic steering control is needed received from the stereo camera device 104 and on information about the positional relationship between each road shoulder and the vehicle, and controls the speed and direction of travel of the vehicle 103 such that the vehicle 103 can travel safely.

Details of the stereo camera device 104 mounted in the vehicle 103 are next described with reference to FIG. 1.

The stereo camera device 104 has a distance information calculating portion 107 for calculating the presence or absence of a physical object (three-dimensional object) in front of the vehicle 106 and the distance from the vehicle 103 to the object from three-dimensional image information based on information about left and right images of an outside environment (in front of the vehicle) taken by a left imaging portion 105 and a right imaging portion 106, a traveled road surface detecting portion 108 for calculating to what portions of the images taken by the left and right imaging portions 105 and 106 does the traveled road surface ahead of the vehicle correspond based on the presence or absence of the object and on the distance information and detecting the traveled road surface, a height difference calculating portion 109 for measuring the height difference between the traveled road surface found by the traveled road surface detecting portion 108 and off-road regions, a road shoulder decision portion 110 for making a decision based on the measured height difference as to whether the road shoulders being the boundaries between the traveled road surface and the off-road regions are road shoulders occurring in a case where the off-road regions are in positions lower than the traveled road surface, and a vehicle departure decision portion 116 for making a decision as to whether the vehicle is in danger of running off the road, based on the result of the decision and on state information (speed of the vehicle itself, steering angle, and so on) about the vehicle itself.

The vehicle 103 having the stereo camera device 104 therein has a warning need decision portion 112 for making a decision as to whether a warning of a danger of running off the road should be issued to the driver, based on the result of the decision made by the vehicle departure decision portion 116 and an automatic control decision portion 111 for making a decision as to whether automatic brake control or automatic steering control of the vehicle 103 is needed based on the result of the decision made by the vehicle departure decision portion 116.

Details of these portions are hereinafter described.

The device is so installed that the left imaging portion 105 and the right imaging portion 106 can image a range located ahead of the vehicle 103 and can image the vehicular road 101 and the subject (three-dimensional object) ahead of the vehicle. Each of the left imaging portion 105 and the right imaging portion 106 is made up of a lens and a CCD (or CMOS imaging device). Parts having specifications that can cover the imaged range are used. It is assumed that the line connecting the left imaging portion 105 and the right imaging portion 106 is parallel to the vehicular road surface and vertical to the direction of motion of the vehicle. The distance d between the left imaging portion 105 and the right imaging portion 106 is determined by the detection range (distance) from the vehicle.

Details of the function of the distance information calculating portion 107 of the stereo camera device 104 are next described with reference to the flowchart of FIG. 2.

Figure 2:
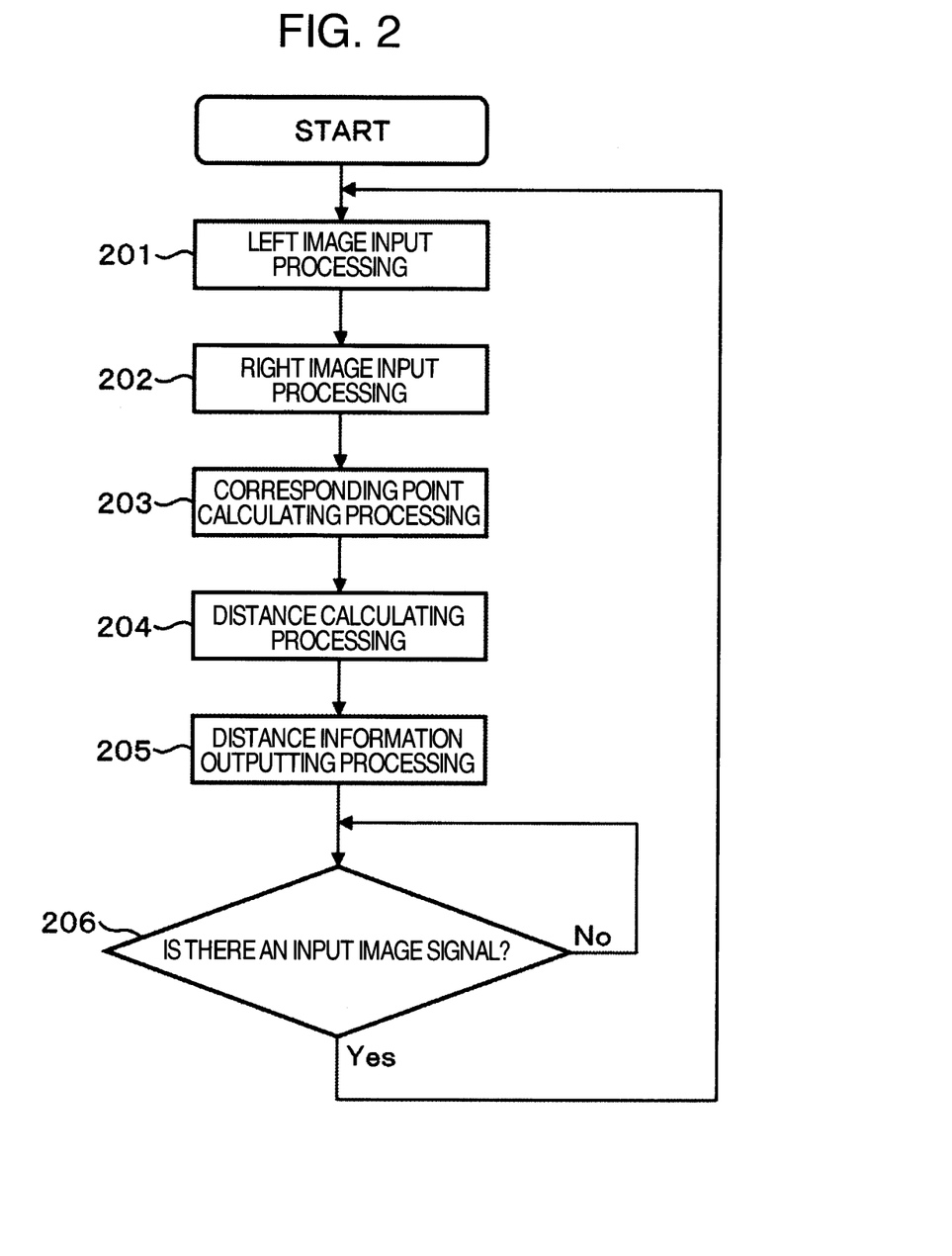
FIG. 2 is a view showing the flow of processing of a distance information-calculating portion of the invention.

In the flowchart of FIG. 2, in left image input processing 201, image data taken by the left imaging portion 105 is first received. Then, in right image input processing 202, image data taken by the right imaging portion 106 is received. Here, the left image input processing 201 and the right image input processing 202 may be simultaneously performed as parallel processing.

Figure 9:
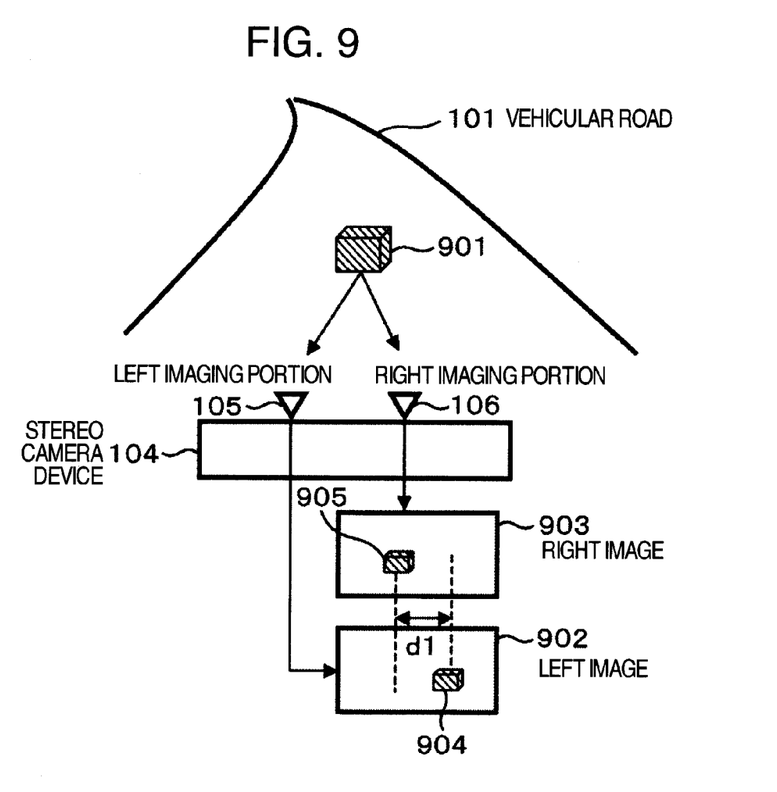
FIG. 9 is a view illustrating corresponding points of left and right images on a stereo camera.

Then, in corresponding point calculation processing 203, two (left and right) images obtained by the left image input processing 201 and the right image input processing 202 are compared and portions of the same object imaged are identified. That is, as shown in FIG. 9, if an object 901 (subject) on the vehicular road 101 is imaged by the stereo camera device 104, images taken by the left imaging portion 105 and the right imaging portion 106 are a left image 902 and a right image 903, respectively. Here, the same object 901 is imaged at position 904 in the left image 902 and imaged at position 905 in the right image 903. Since a deviation $d_1$ occurs in the lateral direction of the image, it is necessary to identify at what portion of the right image 903 is there the object imaged at 904 of the left image 902.

Figure 10:
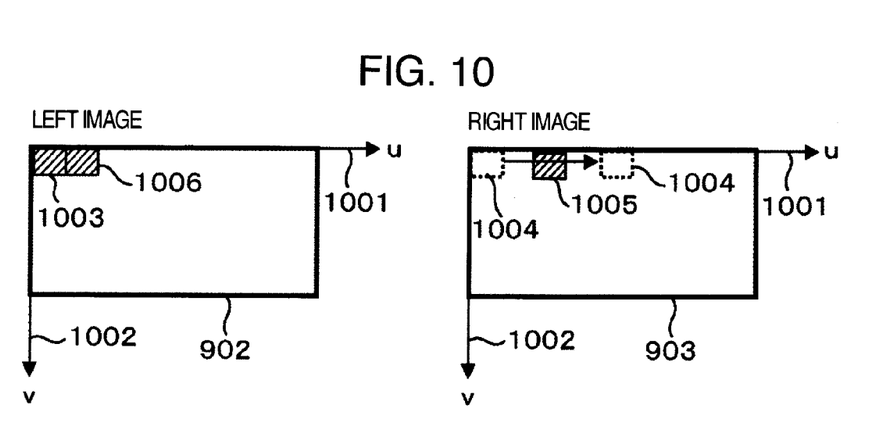
FIG. 10 is a view illustrating the manner in which corresponding points of left and right images of a stereo camera are found.

A method of identifying in what portion of the right image 903 is there a certain object captured in the left image 902 is described by referring to FIG. 10.

In FIG. 10, with respect to the coordinate system of a left image and a right image, let u-axis 1001 lie in the lateral direction. Let v-axis 1002 be the vertical direction. First, in the left image 902, a rectangular region 1003 surrounded by $(u_1, v_1)$, $(u_1, v_2)$, $(u_2, v_1)$, and $(u_2, v_2)$ is set in the uv-coordinate system.

Then, in the right image 903, a region surrounded by $(U, v_1)$, $(U, v_2)$, $(U+(u_2-u_1), v_1)$, and $(U+(u_2-u_1), v_2)$ is scanned to the right of the image up to this rectangular region 1004 by increasing the value of U from $u=0$ to $u=u_3$. This rectangular region 1004 is scanned in the rightward direction of the image. During the scanning, the image inside the rectangular region 1003 and the image inside the rectangular region 1004 are compared in terms of correlation value. It is assumed that the object identical with the object imaged in the rectangular region 1004 is present in positions $(u_4, v_1)$, $(u_4, v_2)$, $(u_4+(u_2-u_1), v_1)$, $(u_4+(u_2-u_2), v_2)$ of a rectangular region 1005 of the right image 903 having the highest correlation with the rectangular region 1003 of the left image 902. It is now assumed that each pixel within the rectangular region 1003 corresponds to its respective pixel within the rectangular region 1005. When the rectangular region 1004 of the right image 903 is scanned, in a case where any rectangular form having a correlation value equal to or higher than a certain value does not exist, it is assumed that there is not any point within the right image 903 corresponding to the rectangular region 1003 of the left image 902.

Then, the rectangular region of the left image 902 is shifted to the position of 1006, and similar processing is performed. In this way, points within the right image 903 corresponding to all the pixels in the left image 902 are found by scanning the rectangular region of the left image 902 across the whole left image 902. Where any corresponding points are not found, it is determined that there are no corresponding points.

Then, in the flowchart of FIG. 2, distance calculating processing 204 is performed.

In the distance calculating processing 204, distances of points from the stereo camera device 104 are computed, the points corresponding to the left image 902 and right image 903 taken from the same object and found in the aforementioned corresponding point calculation processing 203.

Figure 11:
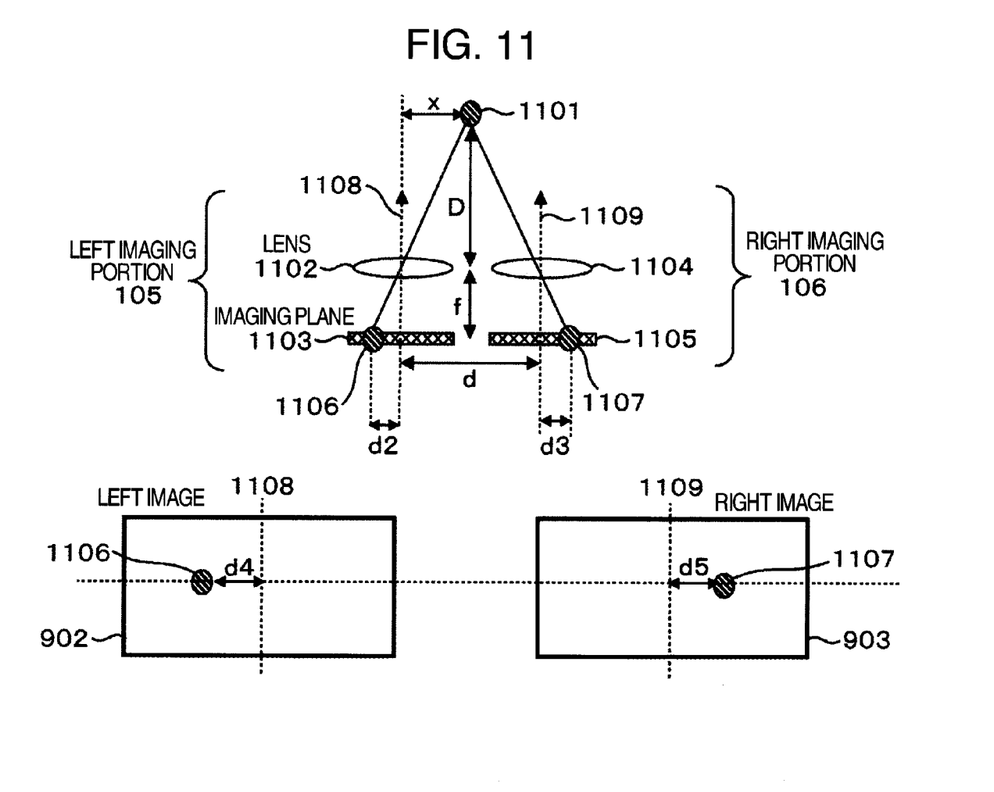
FIG. 11 is a view illustrating the manner in which a parallax is calculated in a stereo camera.

First, a method of calculating the distance of a corresponding point 1101 of the left image 902 and right image 903 from the camera is described by referring to FIG. 11.

In FIG. 11, the left imaging portion 105 is a camera having a focal distance of f and an optical axis 1108 and consisting of a lens 1102 and an imaging plane 1103. The right imaging portion 106 is a camera having a focal distance of f and an optical axis 1109 and consisting of a lens 1104 and an imaging plane 1105. The point 1101 located ahead of the camera is imaged at a point 1106 (at a distance of $d_2$ from the optical axis 1108) of the imaging plane 1103 of the left imaging portion 105 and imaged at the point 1106 (at the position of pixel $d_4$ from the optical axis 1108) in the left image 902. Similarly, the point 1101 located ahead of the camera is imaged at a point 1107 (distance $d_3$ from the optical axis 1109) on the imaging plane 1105 of the right imaging portion 106 and imaged at the point 1107 (the position of pixel $d_5$ from the optical axis 1109) in the right image 903.

In this way, the point 1101 of the same object is imaged at the position of the pixel $d_4$ located to the left of the optical axis 1108 in the left image 902 and imaged at the position of $d_5$ to the right from the optical axis 1109 in the right image 903. As a result, a parallax of pixels $d_4+d_5$ occurs. Therefore, letting x be the distance between the optical axis 1108 and the point 1101 in the left imaging portion 105, the distance D from the stereo camera device 104 to the point 1101 can be found by the following equations:

From the relation between the point 1101 and the left imaging portion 105, $d_2:f=x:D$ From the relation between the point 1101 and the right imaging portion 106, $d_3:f=(d-x):D$.

Accordingly, we have: $D=f\times d/(d_2+d_3)=f\times d/\{(d_4+d_5)\times a\}$, where a is the size of the imaging devices on the imaging planes 1103 and 1105.

The distance calculation described so far is performed for all the corresponding points calculated in the aforementioned corresponding point calculation processing 203. As a result, a distance image representing the distance from the camera to the subject can be found.

In distance information outputting processing 205 of the flowchart of FIG. 2, this distance image is output and stored.

Finally, at a branching point 206 of the flowchart of FIG. 2, if there are input image signals from the left imaging portion 105 and right imaging portion 106, control returns to the processing 201. At the branching point 206, if there are no input image signals from the left imaging portion 105 and right imaging portion 106, control waits until input image signals are applied to the image distance calculating portion 107.

Details of processing about the vehicular road surface detecting portion 108 of the stereo camera device 104 of FIG. 1 are next described with reference to the flowchart of FIG. 3.

Figure 3:
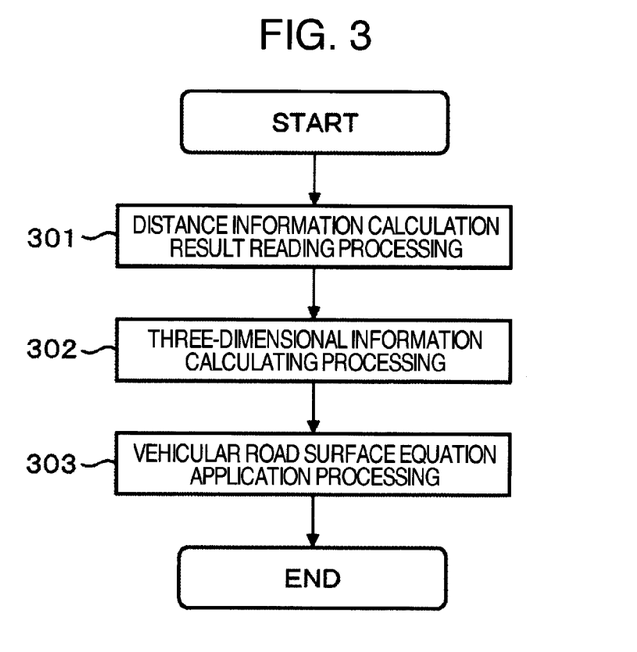
FIG. 3 is a view showing the flow of processing of a vehicular road surface calculating portion of the invention.

In the flowchart of FIG. 3, in distance information calculation result reading processing 301, a distance image output by the distance information outputting processing 205 of the distance information calculating portion 107 is first read in.

Figure 4:
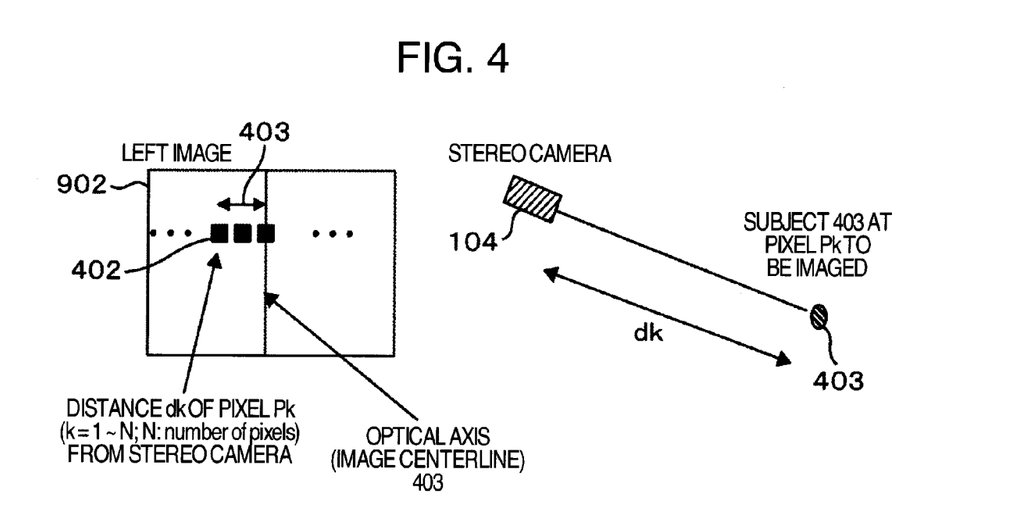
FIG. 4 is a view illustrating a method of finding three-dimensional positions with a stereo camera.
Figure 5:
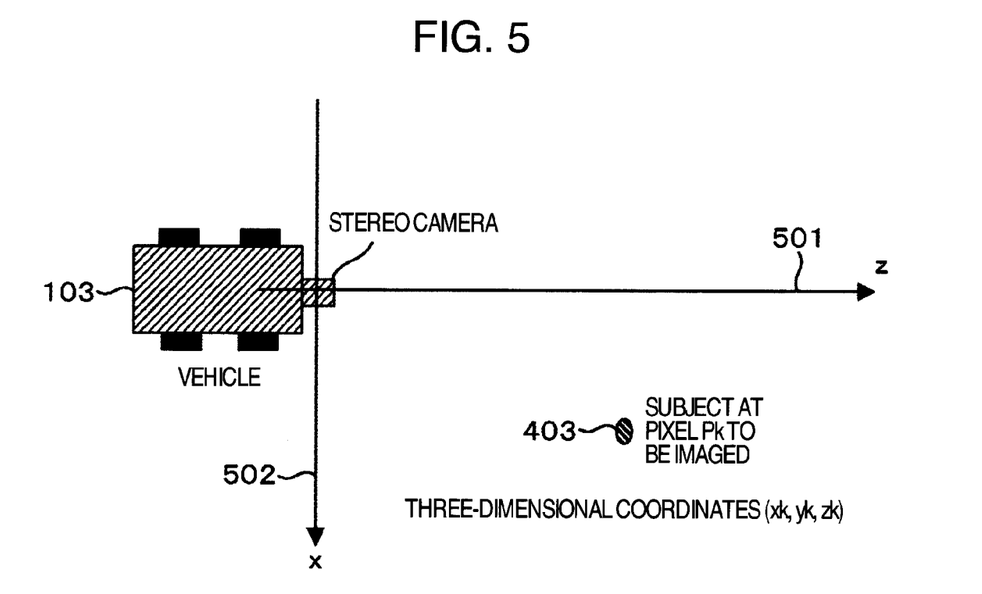
FIG. 5 is a view illustrating a method of finding three-dimensional positions with a stereo camera.

Then, in three-dimensional information calculating processing 302, the three-dimensional position of each pixel on the screen is found using the distance image read in at the distance information calculation result reading processing 301. As shown in FIG. 4, the distance image has been obtained by calculating the distance dk of a subject 403 from the stereo camera device 104 that is imaging each pixel Pk (k=1~N; N is the number of pixels of the left image 902) 402 of the left image 902 taken by the left imaging portion 105 for all the pixels in the left image 902. Using the distance dk, the three-dimensional coordinate values (xk, yk, zk) of the subject 403 to be imaged are calculated. With respect to the three-dimensional coordinates, as shown in FIG. 5, the direction of motion of the vehicle as viewed from above the vehicle 103 is taken as a z-axis 501. The axis of the left-and-right direction of the vehicle vertical to the z-axis 501 is taken as an x-axis 502. The axis of the up-and-down direction of the vehicle vertical to the z-axis is taken as a y-axis.

Figure 14:
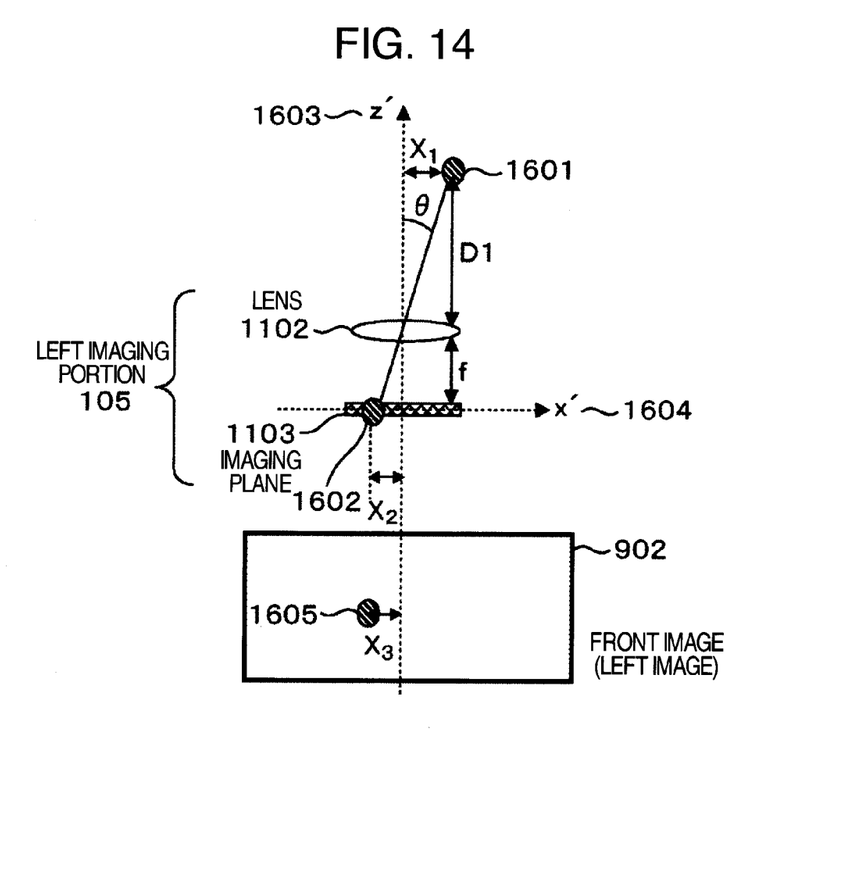
FIG. 14 is a view illustrating a method of finding three-dimensional positions with a stereo camera.

First, in FIG. 5, a method of calculating xk that is an x-coordinate value of the subject 403 to be imaged is described. In FIG. 14, the left imaging portion 105 is a camera having a focal distance off and an optical axis of z'-axis 1603 and consisting of a lens 1102 and an imaging plane 1103. The z-axis 501 of FIG. 5 and the z'-axis 1603 of FIG. 14 are on the same plane as the plane perpendicular to the xz-plane of FIG. 5. The angle made between the z-axis 501 and the z'-axis 1603 is coincident with an angle of dip α at which the stereo camera device 104 is installed.

Let x' 1604 be an axis including the imaging plane 1103 of FIG. 14 and being vertical to the z'-axis 1603. The x'-axis 1604 of FIG. 14 and the x-axis 502 of FIG. 5 are coincident. It is assumed that the subject 403 to be imaged in FIG. 5 is a point 1601 of FIG. 14. It is assumed that the point 1601 is imaged at the position of $X_2$ from the optical axis 1603 of an imaging plane 1602. In particular, it is assumed that the imaging device has a size of a in the direction of the x'-axis 1604 in the imaging plane 1103. The point 1601 is imaged at a position 1605 of a pixel $X_3=X_2/a$ from the optical axis 1603 of the left image 902. Letting dk be the distance of the point 1601 from the camera, we have $X_2:f=X_1:D_1$ (where $D_1=dk\times\cos\theta$ (where θ gives tan $\theta=X_2/f$).

Therefore, $X_1=D_1\times X_2/f=D_1\times X_3\times a/f$, where $X_3$ is the number of pixels corresponding to 403 of FIG. 4. In FIG. 4, when the centerline of the screen corresponding to the position of the optical axis is indicated by 404, the number of pixels of the subject pixel Pk 402 from the centerline 403 of the screen is equivalent to $X_3$. Furthermore, $X_2$ is the same as xk of FIG. 5.

Referring next to FIG. 5, a method of calculating the yk that is the y-coordinate value of the subject 403 to be imaged is described.

Figure 15:
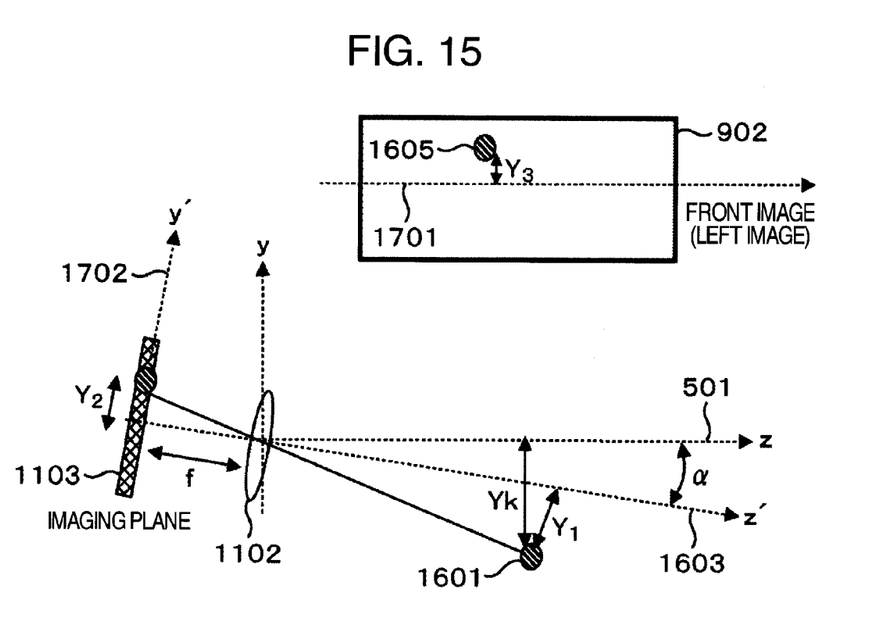
FIG. 15 is a view illustrating a method of finding three-dimensional positions with a stereo camera.

In FIG. 15, the left imaging portion 105 has a lens 1102 and an imaging plane 1103. Let f be the focal distance. Let z'-axis 1603 be the optical axis. The z-axis 501 of FIG. 15 is the same as the z-axis 501 of FIG. 5. The angle made between the z-axis 501 and the z'-axis 1603 is coincident with the angle of dip α at which the stereo camera device 104 is installed. Furthermore, it is assumed that a y'-axis 1702 contains the imaging plane 1103 of FIG. 15 and is vertical to the z'-axis 1603. Now, let the point 1601 of FIG. 14 be the subject 403 to be imaged in FIG. 5. It is assumed that the point 1601 is imaged at the position of $Y_2$ from the optical axis 1603 of the imaging plane 1103. That is, it is assumed that the imaging device has size b in the direction of the y'-axis 1702 in the imaging plane 1103. The point 1601 is imaged at the position 1605 of a pixel of $Y_3=Y_2/a$ from the center 1701 of the screen of the left image 902. Assuming that the distance of the point 1601 from the camera is dk, we have $Yk=dk*\sin(\theta+\alpha)$ (where θ gives tan $\theta=Y_2/f$).

Finally, in FIG. 5, a method of calculating zk that is the z-coordinate value of the subject 403 to be imaged is described.

In FIG. 15, $zk=dk*\cos(\theta+\alpha)$ (where θ gives tan $\theta=Y_2/f$).

As described so far, the three-dimensional coordinates (xk, yk, zk) of the pixel Pk are calculated about all the pixels of the left image 902 of FIG. 4.

In the flowchart of FIG. 3, vehicular road surface equation application processing 303 is then performed.

In the vehicular road surface equation application processing 303, those of the pixels of the left image 902 found in the three-dimensional information calculating processing (pretreatment) 302 which are highly likely to be a vehicular road surface are extracted.

Figure 6:
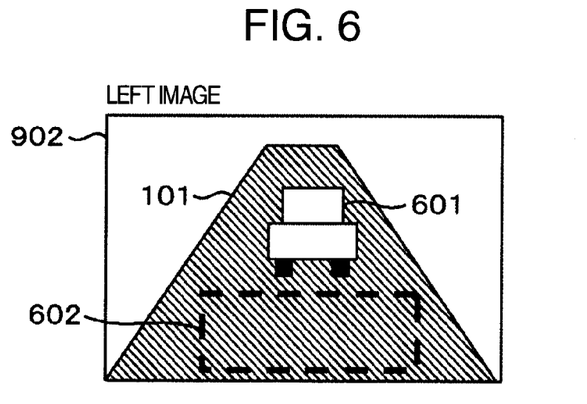
FIG. 6 is a view illustrating a method of finding a vehicular road surface with a stereo camera.

In FIG. 6, the left image 902 is an image taken by the left imaging portion 105. The vehicular road 101 is a road taken in the left image. Furthermore, an object 601 in FIG. 6 is an object hiding the vehicular road surface such as a vehicle or the like traveling ahead of the subject vehicle. Those portions on which an object such as the object 601 is unlikely to exist and which are close to the vehicle and indicated by the dotted line 602 are extracted as pixels used for application of a vehicular road surface equation.

In the coordinate system shown in FIG. 5, let ax+by+cz+d=0 be the vehicular road surface equation. Let Pi (xi, yi, zi) (where i=0~J (J is the number of extracted pixels)) be the three-dimensional coordinates of the pixels extracted as described above. The vehicular road surface equation can be found by calculating the parameters a, b, and c satisfying the Pi.

Then, processing performed by the height difference calculating portion 109 of the stereo camera device 104 of FIG. 1 is described.

In the height difference calculating portion 109, the three-dimensional positions of the pixels of the left image 902 calculated in the flow of the processing of FIG. 3 of the vehicular road surface detecting portion 108 are compared with the vehicular road surface equation. Those of the pixels which are located at portions lower than the vehicular road surface are extracted.

Figure 7:
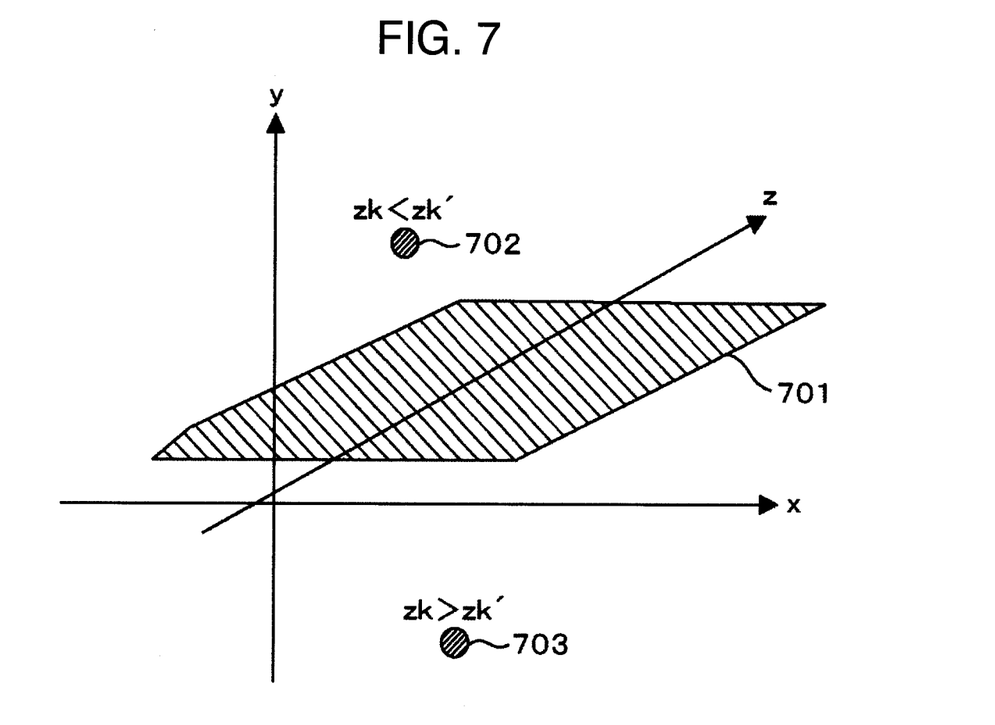
FIG. 7 is a view illustrating a method of detecting an off-road region lower than a vehicular road surface.

FIG. 7 is a perspective view of the coordinate system defined in FIG. 5. A vehicular road surface 701 of FIG. 7 is a vehicular road surface represented by the road surface equation, $ax+by+cz+d=0$. Let (xk, yk, zk) be the three-dimensional coordinates of some pixel Pk of the left image 902. The value zk' of z when xk and zk are substituted into the vehicular road surface equation, $ax+by+cz+d=0$, is found. zk' and zk are compared. When zk>zk', it is determined that Pk is at a position higher than the vehicular road surface equation (position of an object 703). Conversely, when zk<zk', it is determined that Pk is at a position lower than the vehicular road surface equation (position of an object 702).

Let Plow be the Pk's judged to be at positions lower than the vehicular road surface equation. Take the Plow as the output from the height difference calculating portion 109 by giving the coordinate values (uk, vk) on the left image and the three-dimensional positions (xk, yk, zk) of the Plow to the pixels of the Plow. The coordinate values (uk, vk) on the left image are the coordinate system shown in FIG. 10. The three-dimensional positions (xk, yk, zk) are the coordinate system shown in FIG. 7.

Processing performed by the road shoulder decision portion 110 of the stereo camera device 104 of FIG. 1 is next described.

Figure 8:
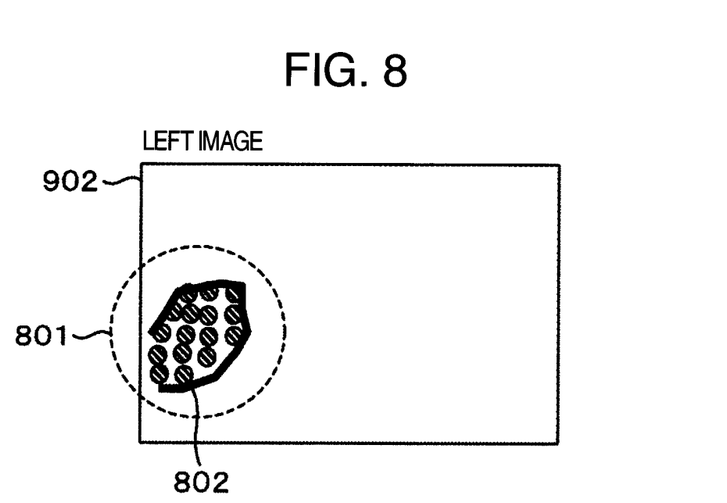
FIG. 8 is a view illustrating a method of detecting a road shoulder in a case where an off-road region is lower than a vehicular road surface.

In the road shoulder decision portion 110, the Plow's of the Pk's judged to be at positions lower than the vehicular road surface equation extracted by the height difference calculating portion 109 are clustered. That is, the three-dimensional positions (xk, yk, zk) possessed by the Plow's are compared. Those having close values of xk, yk, and zk are grouped together. A group having group elements exceeding some number N is extracted as an off-road group, i.e., Plow group, lower than the vehicular road surface. FIG. 8 shows a group of pixels extracted as the off-road group, i.e., Plow group, lower than the vehicular road surface on the left image 902. A portion 801 surrounded by the dotted line is one group.

Regarding the group of pixels extracted as the Plow group, its contour line 802 is next found on the left image 902. When the contour line is found, the coordinate values (uk, vk) possessed by the pixels of the Plow group are utilized. First, pixels having the same vk values are extracted. Pixels having a minimum vk and a maximum uk out of the extracted group of pixels are extracted as contour elements. The values of vk are scanned. Regarding all the pixels in the Plow group, the contour elements are extracted. The group of the extracted contour elements is taken as the contour line 802 of the Plow group.

Those portions which become candidate road shoulders in a case where the off-road regions are lower than the vehicular road surface are then extracted from the found contour line 802.

Figure 12:
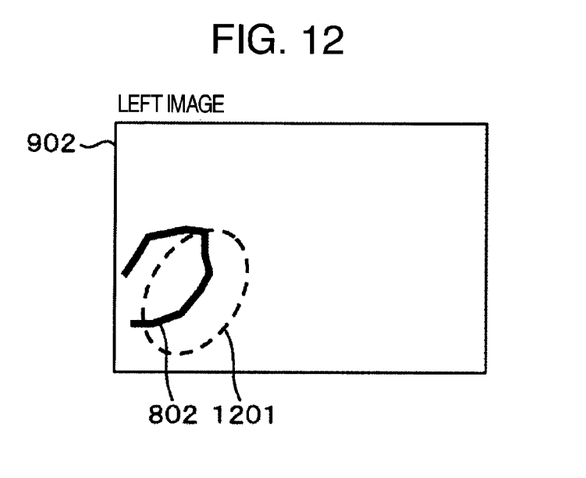
FIG. 12 is a view illustrating a method of detecting a road shoulder in a case where an off-road region is lower than a vehicular road surface.

In FIG. 12, a contour line 802 is a contour line extracted in the left image 902. Where the contour line 802 exists in the left half of the left image 902, if pixels extracted as a contour include pixels having the same value of vk, pixels having larger values of uk are extracted as pixels forming candidate road shoulders defining off-road regions lower than the vehicular road surface. Pixels 1201 surrounded by the dotted line in FIG. 12 correspond to it. On the other hand, if the contour line 802 exists in the right half of the left image 902, and if pixels extracted as a contour include pixels having the same value of vk, pixels having smaller values of uk are extracted as pixels forming candidate road shoulders defining off-road regions lower than the vehicular road surface.

Furthermore, as shown in FIG. 1, road shoulders defining off-road regions lower than the vehicular road surface can be detected even in processing performed by a discontinuity calculating portion 115. The discontinuity indicates a case where the continuities of polygons approximating a road surface around the subject vehicle are judged to have discontinuities equal to or greater than a certain threshold value.

Figure 13:
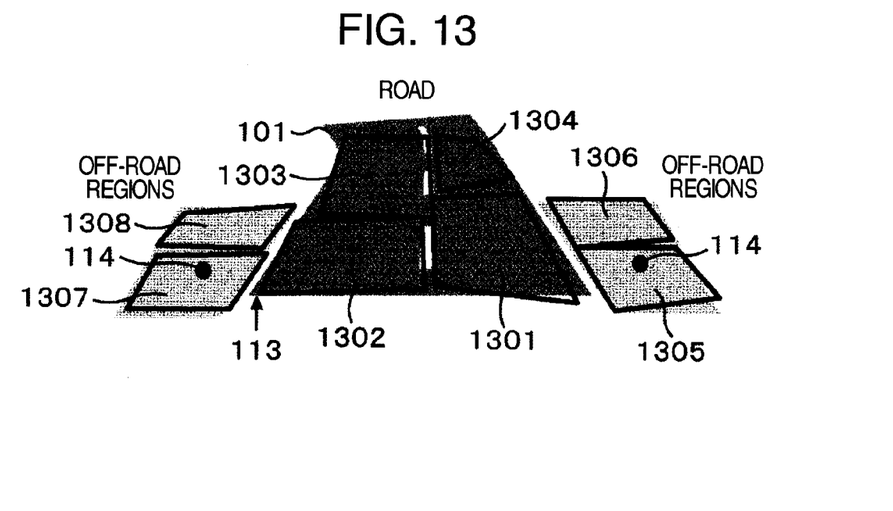
FIG. 13 is a view illustrating a method of detecting a road shoulder in a case where an off-road region is lower than a vehicular road surface.

A distance image calculated by the distance calculating portion 107 is approximated by a plurality of polygonal regions regarding data around the subject vehicle (divided into plural image regions) as shown in FIG. 13.

In FIG. 13, portions of the vehicular road surface 101 are shown to be approximated by four quadrilateral patches (regions 1301-1304). Portions of off-road regions 114 are shown to be approximated by four quadrilateral patches (regions 1305-1308). The quadrilateral patches may be replaced by triangular patches.

Regarding all the tetragons of the regions 1301-1308, the continuity between any two adjacent ones of them is judged. In order to judge the continuity between adjacent tetragons, the distance between their sides closest to each other is calculated. Where the calculated distance is equal to or less than a certain threshold value, the tetragons are judged as continuous. Conversely, where the distance is equal to or greater than the certain threshold value, the tetragons are judged as discontinuous.

In the case of the example of FIG. 13, in a case where the distance between the left side of the quadrilateral region 1302 and the right side of the quadrilateral region 1307 is calculated, the regions are judged as discontinuous and a portion indicated by 113 can be judged as a road shoulder. At this time, because of the up-and-down relationship of the quadrilateral patches, the off-road region 114 may be higher than the surface of the vehicular road 101 in some cases and may be lower than the surface of the vehicular road 101 in other cases. In the present invention, in a case where the off-road region is judged to be lower than the vehicular road surface, the road shoulder decision portion 110 determines that road shoulders occurring in a case where the off-road regions are lower than the vehicular road surface exist.

Processing performed by the vehicle departure decision portion 116 mounted in the vehicle 106 is next described.

The vehicle departure decision portion 116 receives the result of the decision from the road shoulder decision portion 110 of the stereo camera device 104. The contents of the received decision result include a decision as to whether there are the road shoulders 113 on the right and left of the vehicular road 101 ahead of the vehicle occurring in a case where the off-road regions 114 are lower than the surface of the vehicular road 101, as well as the relative position between the road shoulders 113 and the vehicle 103 in a case where there are the road shoulders 113 occurring in a case where the off-road regions 114 are lower than the vehicular road surface.

The vehicle departure decision portion 116 makes a decision as to whether the vehicle is in danger of running off the road taking account of the relative positions with the road shoulders 113 occurring in a case where the received off-road regions 114 are lower than the vehicular road surface, the speed of the subject vehicle, and the direction of motion of the subject vehicle (steering angle), and sends the results to the automatic control decision portion 111.

The automatic control decision portion 111 makes a decision as to whether automatic steering control or automatic brake control for preventing the vehicle from running off the road is needed. If necessary, the automatic control decision portion 111 judges the degree of control. The decision portion 111 sends instructions for control to the vehicle controller and performs steering control or brake control.

Furthermore, the stereo camera device 104 has a function of detecting white lines on the road shoulders 113, guardrails, or the like rather than only the road shoulders 113 occurring where the off-road regions 114 are lower than the vehicular road surface. The detection can be accomplished by the technique of patent literature 1 or the like. Based on detected information, automatic control for preventing the vehicle from running off the road is possible. At this time, where road shoulders occurring where the off-road regions are lower than the vehicular road surface are detected in a manner according to the present invention, the steering control or brake control for preventing the vehicle from running off the road is exerted more strongly than where a white line or a guardrail is detected.

The warning need decision portion 112 makes a decision as to whether it is better to give a warning to the driver about road departure of the vehicle taking account of the relative position with the road shoulders 113 occurring in a case where the off-road regions 114 are lower than the vehicular road surface, the speed of the subject vehicle, and the direction of motion of the subject vehicle (steering angle), based on the result of the decision received from the vehicle departure decision portion 116, and sends instructions to the HEMI (human-machine interface) to give a warning to the driver. At this time, where a road shoulder occurring where the off-road region is lower than the traveled road surface is detected in accordance with the present invention, the degree of warning for preventing the vehicle from running off the road is similarly increased compared with the case where a white line or a guardrail is detected.

In addition, the present invention can replace the stereo camera device 104 of FIG. 1 by a laser range finder. The laser range finder can obtain surrounding three-dimensional positional information, can obtain output similarly to the distance information calculating portion 107, and can detect a road shoulder defining an off-road region lower than a vehicular road surface.

REFERENCE SIGNS LIST

101: vehicular road
103: vehicle
104: stereo camera device
105, 106: imaging portions
108: vehicular road surface detecting portion
109: height difference calculating portion
110: road shoulder decision portion
111: automatic control decision portion
112: warning need decision portion
113: road shoulders
114: off-road regions
115: discontinuity calculating portion
116: vehicle departure decision portion

The invention claimed is:
1. A road-shoulder detecting device comprising:
a distance information calculating portion that calculates a presence or absence of a physical object and a distance from a subject vehicle to the object from input three-dimensional image information about an environment outside of the vehicle;
a vehicular road surface detecting portion that detects a vehicular road surface traveled by the subject vehicle from a distance image based on the calculated distance;
a height difference calculating portion that measures a height difference between the detected vehicular road surface and an off-road region; and
a discontinuity calculating portion that: i) separates a distance image based on the calculated distance into a plurality of image regions, ii) calculates whether a distance between any two of the image regions is equal to or greater than a predetermined threshold value, and iii) judges that the object is a road shoulder because a case in which the predetermined threshold value is reached or exceeded is regarded as discontinuous; and
a road shoulder decision portion that makes a decision, based on the height difference measured by the height difference calculating portion or based on the road shoulder calculated by the discontinuity calculation portion, as to whether a road shoulder being a boundary between the vehicular road surface and the off-road region is a road shoulder occurring in a case where there is an off-road region lower than the vehicular road surface.

2. The road-shoulder detecting device of claim 1, comprising a vehicle departure decision portion that makes a decision as to whether or not the subject vehicle will run off the road based on the result of the decision made by the road shoulder decision portion, on a detected speed of the subject vehicle, and on a steering angle.

3. A vehicle having the road-shoulder detecting device of claim 2, further comprising a warning need decision portion that makes a decision based on the result of the decision made by said vehicle departure decision portion as to whether it is necessary to issue a warning to the driver about running off the road.

4. The vehicle having the road-shoulder detecting device of claim 2, comprising an automatic control decision portion that makes a decision based on the result of the decision made by said vehicle departure decision portion as to whether automatic steering control or automatic brake control that prevents the vehicle from running off the road is needed.

5. The road-shoulder detecting device of claim 1, wherein left image information and right image information about the environment outside of the vehicle is applied to said distance information calculating portion which calculates the presence or absence of the object and the distance from the subject vehicle to the object from three-dimensional image information based on the input left and right image information.

6. The road-shoulder detecting device of claim 5, wherein said distance information calculating portion has a corresponding point calculating processing portion that compares the input left and right image information to identify portions of the images taken from the same object, a distance calculating portion that calculates a distance to said same object identified from imaging devices that obtain image information, and a distance information output processing portion that creates distance information based on the calculated distance and outputting it.

7. The road-shoulder detecting device of claim 1, wherein said vehicular road surface detecting portion has a three-dimensional information calculation processing portion that calculates three-dimensional positions of pixels from the distance image based on the distance calculated by said distance information calculating portion and a vehicular road equation application processing portion that extracts pixels that are highly likely to be the vehicular road surface based on the calculated three-dimensional positions and detecting the vehicular road surface.

8. The road-shoulder detecting device of claim 7, wherein said height difference calculating portion measures the height difference between said vehicular road surface and the off-road region based on the three-dimensional positions calculated by said three-dimensional information calculation processing portion and on the vehicular road surface detected by said vehicular road surface equation application processing portion.

9. The road-shoulder detecting device of claim 1, wherein said road shoulder decision portion extracts off-road regions lower than said vehicular road surface based on said height difference, extracts contour elements regarding all pixels within the extracted off-road regions, takes the extracted contour elements as contour lines of the off-road regions, and judges from the contour lines road shoulders occurring in a case where off-road regions are lower than the vehicular road surface.

10. The road-shoulder detecting device of claim 1, further comprising a vehicle departure decision portion that makes a decision as to whether the subject vehicle will run off the road based on the result of the decision made by said road shoulder decision portion and on a detected speed of the subject vehicle and steering angle.

11. The road-shoulder detecting device of claim 1, wherein left image information and right image information about the environment outside of the vehicle is applied to said distance information calculating portion which calculates the presence or absence of the object and the distance from the subject vehicle to the object from three-dimensional image information based on the input left and right image information.

12. The road-shoulder detecting device of claim 11, wherein said distance information calculating portion has a corresponding point calculating processing portion that compares the input left and right image information to identify portions of the images taken from the same object, a distance calculating portion that calculates a distance to said same object identified from imaging devices that obtain image information, and a distance information output processing portion that creates distance information based on the calculated distance and outputting it.

* * * * *